(12) United States Patent
Jin et al.

(10) Patent No.: US 10,929,659 B2
(45) Date of Patent: Feb. 23, 2021

(54) TERMINAL WITH LINE-OF-SIGHT TRACKING FUNCTION, AND METHOD AND APPARATUS FOR DETERMINING POINT OF GAZE OF USER

(71) Applicant: HUAWEI TECHNOLOGIES CO., LTD., Guangdong (CN)

(72) Inventors: Jiaoying Jin, Shenzhen (CN); Tao Lin, Shenzhen (CN); Yingchun Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 23 days.

(21) Appl. No.: 16/281,894

(22) Filed: Feb. 21, 2019

(65) Prior Publication Data

US 2019/0188469 A1    Jun. 20, 2019

Related U.S. Application Data

(63) Continuation of application No. PCT/CN2017/075706, filed on Mar. 6, 2017.

(30) Foreign Application Priority Data

Aug. 22, 2016  (CN) .......................... 201610701368.X

(51) Int. Cl.
*G06K 9/00* (2006.01)
*G06F 3/01* (2006.01)
(Continued)

(52) U.S. Cl.
CPC ........... *G06K 9/00604* (2013.01); *G06F 3/01* (2013.01); *G06T 7/70* (2017.01); *H04B 10/502* (2013.01);
(Continued)

(58) Field of Classification Search
None
See application file for complete search history.

(56) References Cited

U.S. PATENT DOCUMENTS 9,004,687 B2 * 4/2015 Stack .................... A61B 5/6803
351/209
2008/0136916 A1 * 6/2008 Wolff ...................... H04N 5/232
348/169
(Continued)

FOREIGN PATENT DOCUMENTS

| CN | 101901485 A | 12/2010 |
|---|---|---|
| CN | 102496005 A | 6/2012 |

(Continued)

OTHER PUBLICATIONS

International Search Report, dated Jun. 7, 2017, in International Application No. PCT/CN2017/075706 (5 pp.).
(Continued)

*Primary Examiner* — Talha M Nawaz
(74) *Attorney, Agent, or Firm* — Conley Rose, P.C.

(57) ABSTRACT

A terminal with a line-of-sight tracking function is disclosed. The terminal with a line-of-sight tracking function includes a body, a camera, and at least two light emitting diodes. The camera and the at least two light emitting diodes are mounted on the body, so that the terminal can emit a ray by using the at least two light emitting diodes, to ensure that the emitted ray can be shined on an eye of the user when the user is at different angles. After the ray is reflected by the eye of the user, the terminal can collect the reflected ray by using the camera, obtain an eye image of the user, and track a line of sight of the user based on the eye image, thereby increasing a success rate of line-of-sight tracking.

20 Claims, 7 Drawing Sheets

(51) Int. Cl.
*G06T 7/70* (2017.01)
*H04B 10/50* (2013.01)
*H04N 5/225* (2006.01)

(52) U.S. Cl.
CPC .. *G06T 2207/30201* (2013.01); *H04N 5/2256* (2013.01)

(56) References Cited

U.S. PATENT DOCUMENTS

| | | | |
|---|---|---|---|
| 2014/0028861 A1* | 1/2014 | Holz | H04N 5/357 348/208.4 |
| 2015/0145777 A1 | 5/2015 | He et al. | |
| 2015/0199006 A1* | 7/2015 | He | G06F 3/013 345/158 |
| 2015/0227197 A1 | 8/2015 | Nomura et al. | |

FOREIGN PATENT DOCUMENTS

| | | |
|---|---|---|
| CN | 104113680 A | 10/2014 |
| CN | 104834381 A | 8/2015 |
| CN | 105676565 A | 6/2016 |
| CN | 106339085 A | 1/2017 |

OTHER PUBLICATIONS

Written Opinion of the International Searching Authority, dated Jun. 7, 2017, in International Application No. PCT/CN2017/075706 (8 pp.).
Office Action, dated Oct. 18, 2018, in Chinese Application No. 201610701368.X (9 pp.).
International Search Report dated Jun. 7, 2017 in corresponding International Application No. PCT/CN2017/075706.

\* cited by examiner

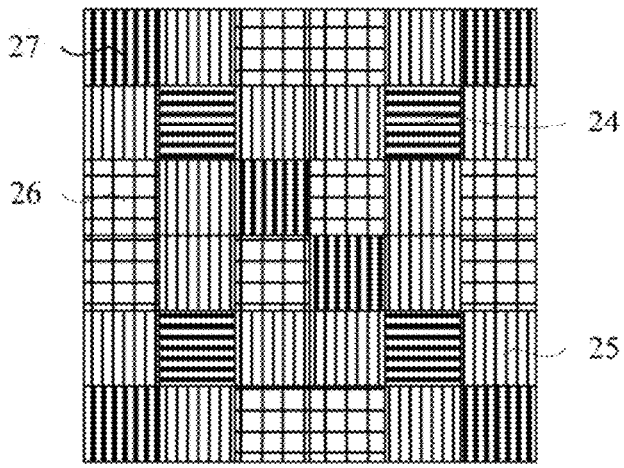

FIG. 14

A terminal emits a first ray by using a first light source, and emits a second ray by using a second light source, where a frequency band of the first ray is different from a frequency band of the second ray, a distance between the first light source and a camera is shorter than a distance between the second light source and the camera, the camera includes a mask filter layer, and the first light source, the second light source, and the camera are all located on the terminal ⸺ 1501

The terminal obtains a first image based on a first filter ray by using the camera, where the first filter ray is a ray obtained after a reflected first ray passes through the mask filter layer ⸺ 1502

The terminal obtains a second image based on a second filter ray by using the camera, where the second filter ray is a ray obtained after a reflected second ray passes through the mask filter layer ⸺ 1503

The terminal determines a point of gaze of a user based on the first image and the second image ⸺ 1504

TERMINAL WITH LINE-OF-SIGHT TRACKING FUNCTION, AND METHOD AND APPARATUS FOR DETERMINING POINT OF GAZE OF USER

CROSS-REFERENCE TO RELATED APPLICATIONS

This application is a continuation of International Application No. PCT/CN2017/075706, filed on Mar. 6, 2017, which claims priority to Chinese Patent Application No. 201610701368.X, filed on Aug. 22, 2016, The disclosures of the aforementioned applications are hereby incorporated by reference in their entireties.

TECHNICAL FIELD

This application relates to the field of electronic information technologies, and in particular, to a terminal with a line-of-sight tracking function, and a method and an apparatus for determining a point of gaze of a user.

BACKGROUND

In a process of interaction between a user and the outside, a line of sight of the user usually can intuitively and naturally reflect an object of interest, a purpose, and a requirement of the user. Therefore, tracking of the line of sight of the user can be applied to a plurality of aspects, including market analysis (advertising/packaging design, mall shopping, and the like), a user experience test (website/software design, an electronic game, and the like), and user intention and psychology motivation analysis (human computer interaction, a mental disorder, cognitive psychology, and the like). Therefore, a line-of-sight tracking method is urgently required.

In the prior art, as shown in FIG. 1, a line-of-sight tracking system includes a terminal 1 and a camera 2, and the terminal 1 is disposed with a light source 12. As shown in FIG. 2, when the light source 12 emits a ray that is shined on an eye 3 of a user, the eye 3 of the user can reflect the ray. Therefore, the camera 2 is invoked to collect a reflected ray that is of the ray and that is reflected by the eye 3 of the user, so as to obtain an eye image of the user. The eye image includes an image of a pupil of the user and an image formed after a reflection point of the light source 12 on the eye 3 of the user enters the camera 2. Therefore, the line-of-sight tracking system processes the obtained eye image to determine pupil location information and reflection point location information in the eye image, obtains, through estimation, a line-of-sight direction of the user based on the determined pupil location information and reflection point location information by using a preset eyeball geometry model, and determines a point of gaze of the user based on the line-of-sight direction, where the point of gaze is information about a location at which the user currently gazes, so as to track a line of sight of the user.

However, because the user may be at different angles of the terminal 1 when using the line-of-sight tracking system, a ray emitted by the light source 12 may not be shined on the eye 3 of the user when an angle of the user changes. Consequently, the camera 2 cannot obtain an eye image of the user, thereby reducing a success rate and reliability of tracking a line of sight of the user.

SUMMARY

Embodiments of the present invention provide a terminal with a line-of-sight tracking function, and a method and an apparatus for determining a point of gaze of a user, so as to resolve a prior-art problem that a success rate and reliability of tracking a line of sight of the user are reduced because an eye image of the user cannot be obtained. The technical solutions are as follows:

According to a first aspect, a terminal with a line-of-sight tracking function is provided, and the terminal includes:

a body, a camera, and at least two light emitting diodes, where the camera and the at least two light emitting diodes are mounted on the body; and the light emitting diode is configured to emit a ray, and the camera is configured to collect a ray obtained after the ray is reflected.

It should be noted that the camera and the at least two light emitting diodes may be mounted on a same side of the body of the terminal, to ensure that the rays emitted by the at least two light emitting diodes can be shined on an eye of a user.

It should be further noted that the at least two light emitting diodes may also be replaced with another light source. This is not specifically limited in this embodiment of the present invention.

In this embodiment of the present invention, because the at least two light emitting diodes and the camera are mounted on the body of terminal, the terminal can emit a ray by using the at least two light emitting diodes, to ensure that the emitted ray can be shined on the eye of the user when the user is at different angles. After the ray is reflected by the eye of the user, the terminal can collect the reflected ray by using the camera, obtain an eye image of the user, and track a line of sight of the user based on the eye image, thereby increasing a success rate of line-of-sight tracking.

Optionally, the at least two light emitting diodes include a first light emitting diode and a second light emitting diode, where a frequency band of the first light emitting diode is different from a frequency band of the second light emitting diode, and a distance between the first light emitting diode and the camera is shorter than a distance between the second light emitting diode and the camera.

When the distance between the first light emitting diode and the camera is shorter, a ray emitted by the first light emitting diode is closer to an axis of an optical center of the camera, to ensure that the camera can obtain a bright pupil image of the eye of the user by collecting a reflected ray of the first light emitting diode. The second light emitting diode may be far away from the camera, to ensure that the camera can obtain a dark pupil image of the eye of the user by collecting a reflected ray of the second light emitting diode.

It should be noted that in actual application, the first light emitting diode, the second light emitting diode, and the camera may also have another location relationship, to ensure that the camera obtains the bright pupil image by collecting the reflected ray of the first light emitting diode, and obtains the dark pupil image by collecting the reflected ray of the second light emitting diode. This is not specifically limited in this embodiment of the present invention.

It should be further noted that because the frequency band of the first light emitting diode is different from the frequency band of the second light emitting diode, when the first light emitting diode and the second light emitting diode simultaneously emit rays, the terminal can separately obtain, based on the frequency band of the first light emitting diode and the frequency band of the second light emitting diode through filtering, a ray emitted by the first light emitting diode and a ray emitted by the second light emitting diode. In other words, when the first light emitting diode and the second light emitting diode simultaneously emit the rays, the terminal can separately obtain the bright pupil image and the dark pupil image, thereby increasing a success rate of tracking a line of sight by the terminal.

In this embodiment of the present invention because the frequency band of the first light emitting diode is different from the frequency band of the second light emitting diode, and the distance between the first light emitting diode and the camera is shorter than the distance between the second light emitting diode and the camera, the terminal can simultaneously emit a ray by using the first light emitting diode and the second light emitting diode, to obtain the bright pupil image and the dark pupil image, thereby increasing efficiency of obtaining the bright pupil image and the dark pupil image, increasing efficiency of tracking a line of sight of the user, and improving real-time performance and increasing a success rate of line-of-sight tracking.

Optionally, the camera includes a mask filter layer, and the mask filter layer includes at least two filter units.

The frequency band of the first light emitting diode is the same as an operating frequency band of a filter unit in the at least two filter units, and the frequency band of the second light emitting diode is the same as an operating frequency band of another filter unit in the at least two filter units.

It should be noted that the first light emitting diode is used as an example. Because the frequency band of the first light emitting diode is the same as an operating frequency band of a filter unit in the at least two filter units, the filter unit can filter out rays of all frequency bands except the frequency band of the first light emitting diode, to ensure that the camera can accurately collect the reflected ray of the first light emitting diode, and obtain the bright pupil image, thereby increasing a success rate of tracking a line of sight of the user.

It should be further noted that for each of the at least two filter units, the filter unit may include at least one filter, and operating frequency bands of the at least one filter are the same.

In this embodiment of the present invention, when the first light emitting diode and the second light emitting diode simultaneously emit the rays, the terminal can respectively collect the reflected ray of the first light emitting diode and the reflected ray of the second light emitting diode by using the mask filter layer including the at least two filter units, to simultaneously obtain the bright pupil image and the dark pupil image, thereby increasing efficiency and a success rate of obtaining the bright pupil image and the dark pupil image, and improving real-time performance and increasing a success rate of line-of-sight tracking.

Optionally, the at least two filter units are evenly arranged at the mask filter layer.

It should be noted that when filter units that operate at a frequency band are more evenly arranged, rays of the frequency band that are collected by the camera are more evenly distributed, quality of an obtained image is better, and accuracy of tracking a line of sight of the user by the terminal is higher.

Optionally, the at least two light emitting diodes further include a third light emitting diode, where a frequency band of the third light emitting diode is different from both the frequency band of the first light emitting diode and the frequency band of the second light emitting diode, and the distance between the first light emitting diode and the camera is shorter than a distance between the third light emitting diode and the camera.

It should be noted that in another possible implementation, the frequency band of the third light emitting diode is the same as the frequency band of the second light emitting diode.

In this embodiment of the present invention, because the distance between the first light emitting diode and the camera is shorter than the distance between the third light emitting diode and the camera, and the distance between the first light emitting diode and the camera is shorter than the distance between the second light emitting diode and the camera, it is ensured that when the user is at different angles, the terminal can obtain the dark pupil image by collecting the reflected ray of the second light emitting diode and a reflected ray of the third light emitting diode, thereby increasing a success rate of obtaining the dark pupil image, that is, increasing a success rate of tracking a line of sight of the user.

Optionally, the camera includes a mask filter layer, and the mask filter layer includes at least three filter units.

The frequency band of the first light emitting diode is the same as an operating frequency band of a filter unit in the at least three filter units, the frequency band of the second light emitting diode is the same as an operating frequency band of another filter unit in the at least three filter units, and the frequency band of the third light emitting diode is the same as an operating frequency band of still another filter unit in the at least three filter units.

It should be noted that because the frequency band of the first light emitting diode, the frequency band of the second light emitting diode, and the frequency band of the third light emitting diode are both the same as an operating frequency band of a filter unit in the at least three filter units, it is ensured that the terminal can accurately collect the reflected ray of the first light emitting diode, the reflected ray of the second light emitting diode, or the reflected ray of the third light emitting diode, thereby increasing a success rate of obtaining the bright pupil image and the dark pupil image.

In this embodiment of the present invention, because the mask filter layer of the camera includes the at least three filter units, the terminal can accurately collect the reflected ray of the first light emitting diode, the reflected ray of the second light emitting diode, or the reflected ray of the third light emitting diode, and when the first light emitting diode, the second light emitting diode, or the third light emitting diode simultaneously emit a ray, the terminal can also quickly and accurately collect simultaneously the reflected ray of the first light emitting diode, the reflected ray of the second light emitting diode, or the reflected ray of the third light emitting diode, to ensure a success rate and efficiency of obtaining the bright pupil image and the dark pupil image.

Optionally, the at least two light emitting diodes include four light emitting diodes: a fourth light emitting diode, a fifth light emitting diode, a sixth light emitting diode, and a seventh light emitting diode.

A distance between the fourth light emitting diode and the camera is the shortest in distances between all the light emitting diodes and the camera, and a frequency band of the fourth light emitting diode is different from a frequency band of the fifth light emitting diode, a frequency band of the sixth light emitting diode, and a frequency band of the seventh light emitting diode.

It should be noted that a location relationship between the fourth light emitting diode and the camera may be similar to a location relationship between the first light emitting diode and the camera.

It should be further noted that the camera can obtain the bright pupil image by collecting a reflected ray of the fourth light emitting diode, and obtain the dark pupil image by collecting a reflected ray of the fifth light emitting diode, a reflected ray of the sixth light emitting diode, or a reflected ray of the seventh light emitting diode.

In this embodiment of the present invention, because the terminal can obtain the dark pupil image by collecting the reflected ray of the fifth light emitting diode, the reflected ray of the sixth light emitting diode, or the reflected ray of the seventh light emitting diode, a success rate of obtaining the dark pupil image is improved, and a success rate of tracking a line of sight of the user is improved.

Optionally, the camera is in an upper left corner of the body, the fourth light emitting diode is in the upper left corner of the body, the fifth light emitting diode is in an upper right corner of the body, the sixth light emitting diode is in a lower left corner of the body, and the seventh light emitting diode is in a lower right corner of the body.

It should be noted that the camera, the fourth light emitting diode, the fifth light emitting diode, the sixth light emitting diode, and the seventh light emitting diode are disposed in the four corners of the body, to avoid causing interference to a process of normally using the terminal by the user.

It should be further noted that in actual application, the camera, the fourth light emitting diode, the fifth light emitting diode, the sixth light emitting diode, and the seventh light emitting diode may also be disposed at other locations of the body. This is not specifically limited in this embodiment of the present invention.

In this embodiment of the present invention, the camera and the fourth light emitting diode are disposed in the upper left corner of the body, and the fifth light emitting diode, the sixth light emitting diode, and the seventh light emitting diode are separately disposed in three corners of the body, so that it can be ensured that the disposed camera and the disposed light emitting diodes do not interfere with the process of normally using the terminal by the user, and it can be ensured that the terminal can obtain the bright pupil image and the dark pupil image by using the camera, thereby increasing a success rate of tracking a line of sight of the user.

Optionally, the frequency band of the fifth light emitting diode and the frequency band of the sixth light emitting diode are both the same as the frequency band of the seventh light emitting diode.

The camera includes a mask filter layer, and the mask filter layer includes two filter units, where the frequency band of the fourth light emitting diode is the same as an operating frequency band of one filter unit in the two filter units, and the frequency band of the fifth light emitting diode is the same as an operating frequency band of the other filter unit in the two filter units.

In this embodiment of the present invention, because the frequency band of the fifth light emitting diode, the frequency band of the sixth light emitting diode, and the frequency band of the seventh light emitting diode are the same, the mask filter layer may include the two filter units. When an area of the mask filter layer remains unchanged, an area of each filter unit is relatively large, so that a quantity of rays of a corresponding frequency band that pass through the mask filter layer can be increased, thereby improving quality of the obtained bright pupil image and the obtained dark pupil image, and improving accuracy of tracking a line of sight of the user.

Optionally, the frequency band of the sixth light emitting diode is different from the frequency band of the fifth light emitting diode, and the frequency band of the fifth light emitting diode is the same as the frequency band of the seventh light emitting diode.

The camera includes a mask filter layer, and the mask filter layer includes three filter units, where the frequency band of the fourth light emitting diode is the same as an operating frequency band of a filter unit in the three filter units, the frequency band of the fifth light emitting diode is the same as an operating frequency band of another filter unit in the three filter units, and the frequency band of the sixth light emitting diode is the same as an operating frequency band of still another filter unit in the three filter units.

It should be noted that in another possible implementation, the frequency band of the sixth light emitting diode is the same as the frequency band of the fifth light emitting diode, and the frequency band of the fifth light emitting diode is the same as the frequency band of the seventh light emitting diode. Alternatively, in another possible implementation, the frequency band of the sixth light emitting diode is the same as the frequency band of the seventh light emitting diode, and the frequency band of the sixth light emitting diode is different from the frequency band of the fifth light emitting diode.

In this embodiment of the present invention, because the frequency band of the fifth light emitting diode is the same as the frequency band of the seventh light emitting diode, and the frequency band of the fifth light emitting diode is different from the frequency band of the sixth light emitting diode, when a ray emitted by the sixth light emitting diode is interfered with, the terminal can also obtain the dark pupil image by collecting the reflected ray of the fifth light emitting diode or the reflected ray of the seventh light emitting diode, thereby increasing a success rate of obtaining the dark pupil image, and increasing a success rate of tracking a line of sight of the user.

Optionally, the at least two light emitting diodes are infrared emitting diodes, and the camera is an infrared camera.

In this embodiment of the present invention, because the at least two light emitting diodes may be the infrared emitting diodes, and the camera may be the infrared camera, the rays emitted by the at least two light emitting diodes are prevented from causing interference or damage to vision of the user, thereby improving security of tracking a line of sight of the user by the terminal.

According to a second aspect, a method for determining a point of gaze of a user of a terminal is provided, and the method includes:

emitting a first ray by using a first light source, and emitting a second ray by using a second light source, where a frequency band of the first ray is different from a frequency band of the second ray, a distance between the first light source and a camera is shorter than a distance between the second light source and the camera, the camera includes a mask filter layer, and the first light source, the second light source, and the camera are all located on the terminal;

obtaining a first image based on a first filter ray by using the camera, where the first filter ray is a ray obtained after a reflected first ray passes through the mask filter layer;

obtaining a second image based on a second filter ray by using the camera, where the second filter ray is a ray obtained after a reflected second ray passes through the mask filter layer; and determining the point of gaze of the user based on the first image and the second image.

There may be one or more first light sources and second light sources. This is not specifically limited in this embodiment of the present invention.

It should be noted that when there are a plurality of first light sources, frequency bands of the plurality of first light sources are the same, and when there are a plurality of second light sources, frequency bands of the plurality of second light sources may be different.

In this embodiment of the present invention, the terminal can emit the first ray by using the first light source on the terminal, and emit the second ray by using the second light source on the terminal. Because the distance between the first light source and the camera on the terminal is shorter than the distance between the second light source and the camera, the terminal can obtain, by using the camera, the first image based on the first filter ray obtained after the reflected first ray passes through the mask filter layer of the camera, and obtain, by using the camera, the second image based on the second filter ray obtained after the reflected second ray passes through the mask filter layer, where the first image is a bright pupil image, and the second image is a dark pupil image, so as to determine the point of gaze of the user based on the bright pupil image and the dark pupil image, thereby improving accuracy of tracking a line of sight of the user.

Optionally, when there are the plurality of second light sources, at least one second light source may be selected from the plurality of second light sources through polling.

The polling may be performed based on locations of the plurality of second light sources on the terminal, or may be performed based on the frequency bands of the plurality of second light sources. Certainly, in actual application, the polling may also be performed in another manner. This is not specifically limited in this embodiment of the present invention.

Optionally, the determining the point of gaze of the user based on the first image and the second image includes:

determining pupil location information and reflection point location information of the user based on the first image and the second image; and determining the point of gaze of the user based on the pupil location information, the reflection point location information, and a preset eyeball geometry model.

The pupil location information is information about a location of a pupil of the user in the first image and the second image, and the reflection point location information is information about a location of an image that is in the second image and that is formed by a reflection point of the second light source on an eye of the user entering the camera.

It should be noted that the preset eyeball geometry model may be determined in advance according to a cornea reflection principle and a cornea refraction principle.

In this embodiment of the present invention, a differential image for the first image and the second image may be determined to quickly and accurately determine the pupil location information of the user, the second image is processed to determine the reflection point location information, and then the point of gaze of the user is determined based on the preset eyeball geometry model. In this way, efficiency and real-time performance of tracking a line of sight of the user are improved.

Optionally, a moment of emitting the first ray by using the first light source is the same as a moment of emitting the second ray by using the second light source.

In this embodiment of the present invention, because the moment of emitting the first ray is the same as the moment of emitting the second ray, a time for obtaining a bright pupil image and a dark pupil image by the camera is saved, and real-time performance of tracking a line of sight of the user is improved.

According to a third aspect, an apparatus for determining a point of gaze of a user of a terminal is provided, and the apparatus for determining a point of gaze of a user of a terminal has a function of implementing behavior in the method for determining a point of gaze of a user of a terminal in the second aspect. The apparatus for determining a point of gaze of a user of a terminal includes at least one module, and the at least one module is configured to implement the method for determining a point of gaze of a user of a terminal in the second aspect.

According to a fourth aspect, an apparatus for determining a point of gaze of a user of a terminal is provided, and a structure of the apparatus for determining a point of gaze of a user of a terminal includes a processor and a memory. The memory is configured to: store a program that supports the apparatus for determining a point of gaze of a user of a terminal in performing the method for determining a point of gaze of a user of a terminal, and store related data used to implement the method for determining a point of gaze of a user of a terminal. The data includes a first image, a second image, and the like. The processor is configured to execute the program stored in the memory. The apparatus for determining a point of gaze of a user of a terminal may further include a communications bus, and the communications bus is configured to establish a connection between the processor and the memory.

According to a fifth aspect, a computer storage medium is provided, and is configured to store a computer software instruction used by the apparatus for determining a point of gaze of a user of a terminal, or store a program designed to execute the apparatus for determining a point of gaze of a user of a terminal in the third aspect and the fourth aspect.

Technical effects obtained in the third aspect to the fifth aspect in the foregoing embodiments of the present invention are similar to technical effects obtained by using corresponding technical means in the second aspect. Details are not described herein again.

The technical solutions provided in the embodiments of the present invention have the following beneficial effects: In the embodiments of the present invention, the terminal includes the body, and the camera and the at least two light emitting diodes mounted on the body. Because all of the at least two light emitting diodes can emit rays, it is ensured that the camera can collect reflected rays when the user is at different angles, thereby increasing a success rate of obtaining an eye image of the user, and increasing a success rate of tracking the line of sight of the user.

BRIEF DESCRIPTION OF DRAWINGS

FIG. 14 is a schematic diagram of a yet further mask filter layer according to an embodiment of the present invention;

FIG. 15 is a flowchart of a method for determining a point of gaze of a user of a terminal according to an embodiment of the present invention;

DESCRIPTION OF EMBODIMENTS

To make the objectives, technical solutions, and advantages of this application clearer, the following further describes the implementations of this application in detail with reference to the accompanying drawings.

Figure 1:
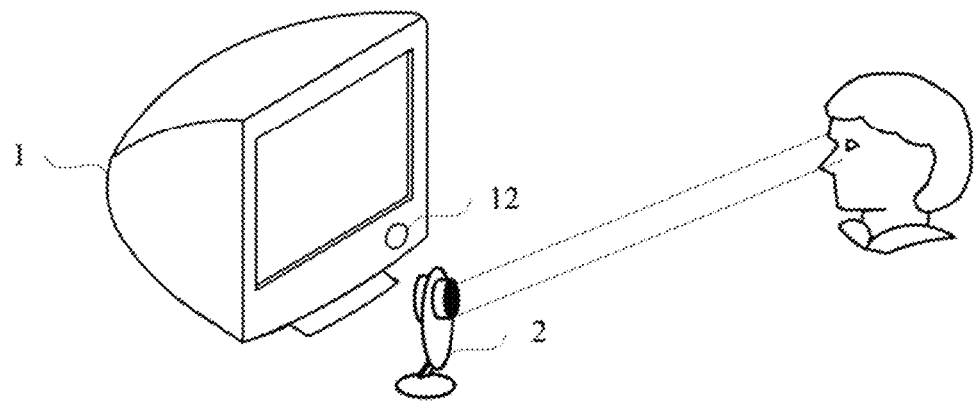
FIG. 1 is a schematic diagram of a line-of-sight tracking system in the prior art.
Figure 2:
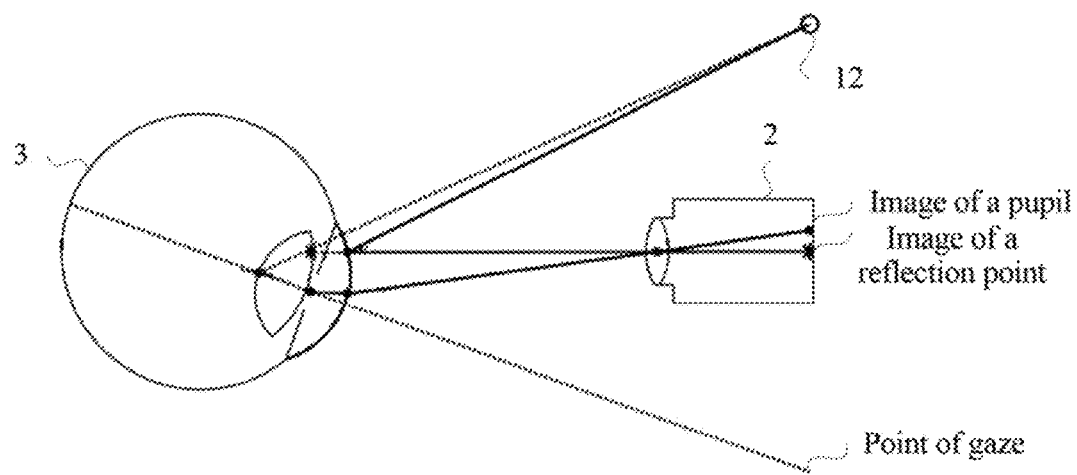
FIG. 2 is a schematic diagram of a line-of-sight tracking principle in the prior art.
Figure 3:
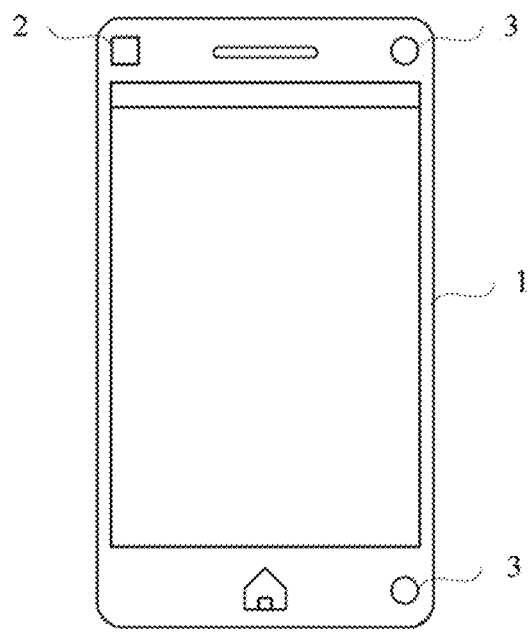
FIG. 3 is a schematic diagram of a terminal with a line-of-sight tracking function according to an embodiment of the present invention.

FIG. 3 is a schematic diagram of a terminal with a line-of-sight tracking function according to an embodiment of the present invention. Referring to FIG. 3, the terminal includes a body 1, a camera 2, and at least two light emitting diodes 3. The camera 2 and the at least two light emitting diodes 3 are mounted on the body 1. The light emitting diode 3 is configured to emit a ray, and the camera 2 is configured to collect a ray obtained after the ray is reflected.

The at least two light emitting diodes 3 can emit rays, and when the rays are shined on an eye of a user, the eye of the user reflects the rays. Therefore, the reflected rays may be collected by using the camera 2, to track a line of sight of the user.

It should be noted that the camera 2 and the at least two light emitting diodes 3 may be disposed on a same side of the body 1, to ensure that the camera 2 can collect the rays of the at least two light emitting diodes 3 that are reflected by the eye of the user.

It should be further noted that when a quantity of the at least two light emitting diodes 3 is larger, a success rate of collecting a reflected ray by the camera 2 when the user is at different angles is higher, and a success rate of tracking a line of sight by using the terminal is also higher.

It should be further noted that the terminal may be a terminal such as a mobile phone or a tablet computer. Certainly, in actual application, the terminal may also be another terminal that needs to track a line of sight of a user. This is not specifically limited in this embodiment of the present invention.

In addition, in actual application, the at least two light emitting diodes 3 may also be replaced with another light source. This is not specifically limited in this embodiment of the present invention.

It should be noted that for each of the at least two light emitting diodes 3, the light emitting diode may be a light emitting diode at any frequency band. In other words, the light emitting diode may emit a ray of any frequency band. This is not specifically limited in this embodiment of the present invention.

It should be further noted that in actual application, for each of the at least two light emitting diodes 3, the light emitting diode may be a light emitting diode at any frequency. In other words, the light emitting diode may emit a ray of any frequency.

Further, all of the at least two light emitting diodes 3 may be infrared emitting diodes, and correspondingly, the camera may be an infrared camera, to prevent the rays emitted by the at least two light emitting diodes 3 from causing interference or damage to normal vision of the user.

The following describes each part of the terminal in detail.

At least two light emitting diodes 3

Figure 4:
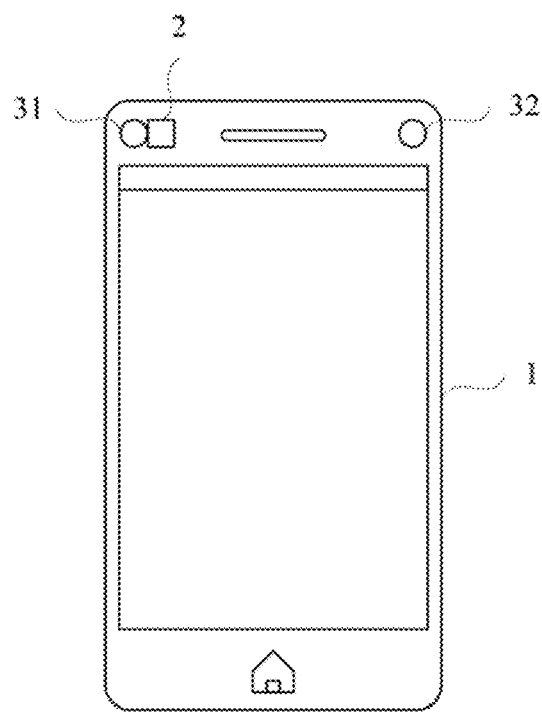
FIG. 4 is a schematic diagram of another terminal with a line-of-sight tracking function according to an embodiment of the present invention.

Referring to FIG. 4, the at least two light emitting diodes 3 include a first light emitting diode 31 and a second light emitting diode 32. A frequency band of the first light emitting diode 31 is different from a frequency band of the second light emitting diode 32, and a distance between the first light emitting diode 31 and the camera 2 is shorter than a distance between the second light emitting diode 32 and the camera 2.

Because the distance between the first light emitting diode 31 and the camera 2 is shorter than the distance between the second light emitting diode 32 and the camera 2, the first light emitting diode 31 is close to the camera 2, and a ray of the first light emitting diode 31 is close to an axis of an optical center of the camera 2 after being reflected by an eyeball cornea surface of the user. Therefore, a relatively large quantity of reflected rays enter the camera 2, and the camera 2 may obtain a bright pupil image of the eye of the user when collecting the reflected ray of the first light emitting diode 31. The second light emitting diode 32 is far away from the camera 2, and a ray of the second light emitting diode 32 is far away from the axis of the optical center of the camera 2 after being reflected by an eyeball cornea surface of the user. Therefore, a relatively small quantity of reflected rays enter the camera 2, and the camera 2 may obtain a dark pupil image of the eye of the user when collecting the reflected ray of the second light emitting diode 32.

The optical center of the camera 2 may be a center of a lens of the camera 2.

It should be noted that each of the bright pupil image and the dark pupil image may be a grayscale image that includes the eye of the user, a pupil of the eye of the user in the bright pupil image is bright, and a pupil of the eye of the user in the dark pupil image is gray.

It should be further noted that when the first light emitting diode 31 is closer to the camera 2, a ray obtained after a ray emitted by the first light emitting diode 31 is reflected by the eye of the user is closer to the axis of the optical center of the camera 2, quality of a bright pupil image obtained by using the camera 2 is better, and accuracy of tracking a line of sight of the user by the terminal is higher. For example, the first light emitting diode 31 may be closely adjacent to the camera 2, or the first light emitting diode 31 may be located on the same axis as the camera 2.

Figure 5:
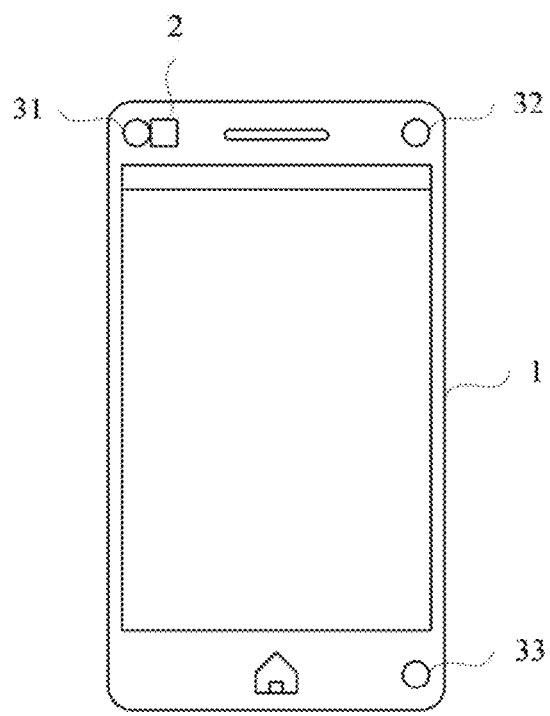
FIG. 5 is a schematic diagram of still another terminal with a line-of-sight tracking function according to an embodiment of the present invention.

Referring to FIG. 5, the at least two light emitting diodes 3 further include a third light emitting diode 33. A frequency band of the third light emitting diode 33 is different from both the frequency band of the first light emitting diode 31 and the frequency band of the second light emitting diode 32, and the distance between the first light emitting diode 31 and the camera 2 is shorter than a distance between the third light emitting diode 33 and the camera 2.

It can be learned from the foregoing description that the distance between the first light emitting diode 31 and the camera 2 is shorter than the distance between the second light emitting diode 32 and the camera 2. Therefore, when the at least two light emitting diodes 3 further include the third light emitting diode 33, and the distance between the first light emitting diode 31 and the camera 2 is shorter than the distance between the third light emitting diode 33 and the camera 2, the first light emitting diode 31 is closest to the camera 2 compared with the second light emitting diode 32 and the third light emitting diode 33.

It should be noted that when the terminal further includes the third light emitting diode 33, it is ensured that a dark pupil image can also be obtained when the user is at a different angle, thereby increasing a success rate of obtaining a dark pupil image, and increasing a success rate of tracking a line of sight of the user.

It should be further noted that in another possible implementation, the frequency band of the third light emitting diode 33 may be the same as the frequency band of the second light emitting diode 32.

Figure 6:
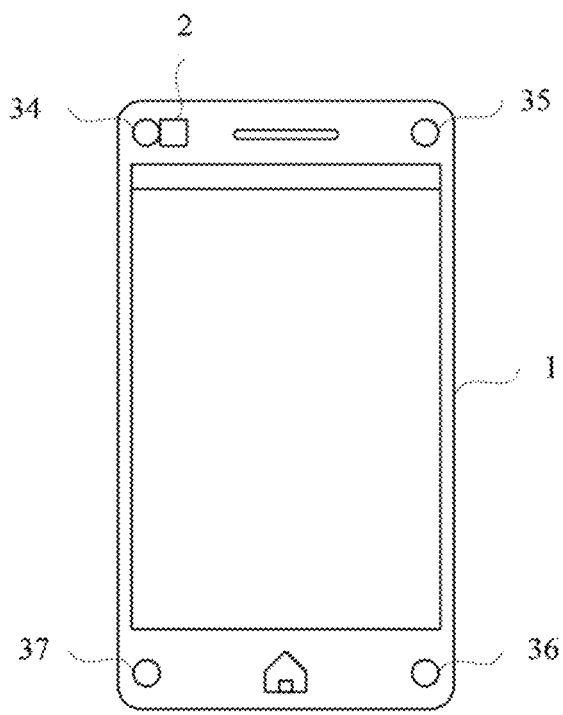
FIG. 6 is a schematic diagram of yet another terminal with a line-of-sight tracking function according to an embodiment of the present invention.

Referring to FIG. 6, the at least two light emitting diodes 3 include four light emitting diodes: a fourth light emitting diode 34, a fifth light emitting diode 35, a sixth light emitting diode 36, and a seventh light emitting diode 37. A distance between the fourth light emitting diode 34 and the camera 2 is the shortest in distances between all the light emitting diodes and the camera 2, and a frequency band of the fourth light emitting diode 34 is different from a frequency band of the fifth light emitting diode 35, a frequency band of the sixth light emitting diode 36, and a frequency band of the seventh light emitting diode 37.

In a possible implementation, the camera 2 is in an upper left corner of the body 1, the fourth light emitting diode 34 is in the upper left corner of the body 1, the fifth light emitting diode 35 is in an upper right corner of the body 1, the sixth light emitting diode 36 is in a lower left corner of the body 1, and the seventh light emitting diode 37 is in a lower right corner of the body 1.

Mask Filter Layer

Figure 7:
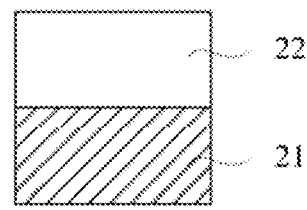
FIG. 7 is a schematic diagram of a mask filter layer according to an embodiment of the present invention.

Referring to FIG. 7, the camera 2 includes a mask filter layer, and the mask filter layer includes at least two filter units, so as to collect reflected rays of the first light emitting diode 31 and the second light emitting diode 32. The frequency band of the first light emitting diode 31 is the same as an operating frequency band of a filter unit 21 in the at least two filter units, and the frequency band of the second light emitting diode 32 is the same as an operating frequency band of another filter unit 22 in the at least two filter units.

Because the operating frequency band of the first light emitting diode 31 is the same as the operating frequency band of the filter unit 21, the filter unit 21 can filter out rays of all frequency bands except the frequency band of the first light emitting diode 31. Correspondingly, the filter unit 22 can filter out rays of all frequency bands except the frequency band of the second light emitting diode 32. In addition, because the filter unit 21 and the filter unit 22 are filter units in the at least two filter units included in the mask filter layer, the camera can collect both the reflected ray of the first light emitting diode 31 and the reflected ray of the second light emitting diode 32.

It should be noted that for each of the at least two filter units included in the mask filter layer, an operating frequency band of the filter unit may be the same as a frequency band of any one of the at least two light emitting diodes 3, and when filter units that operate at a frequency band have a larger area and are more evenly distributed, a quantity of rays of the frequency band that are collected by the camera 2 is larger, quality of an obtained image is higher, and accuracy of tracking a line of sight of the user by the terminal is higher. The filter unit 21 is used as an example. When a quantity of filter units 21 included in the mask filter layer is larger and the filter units 21 are more evenly distributed, a quantity of reflected rays that are of the first light emitting diode 31 and that can be collected by the camera 2 is larger, and quality of an obtained bright pupil image is higher.

It should be further noted that for each of the at least two filter units, the filter unit may include at least one filter, and operating frequency bands of the at least one filter are the same.

Figure 8:
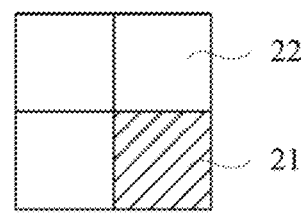
FIG. 8 is a schematic diagram of another mask filter layer according to an embodiment of the present invention.
Figure 9:
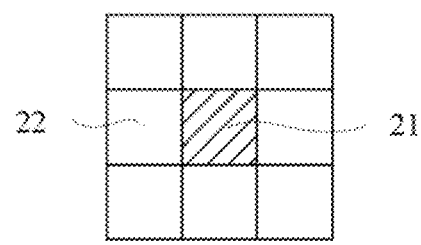
FIG. 9 is a schematic diagram of still another mask filter layer according to an embodiment of the present invention.
Figure 10:
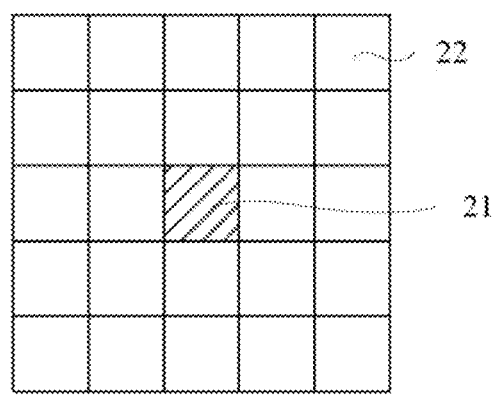
FIG. 10 is a schematic diagram of yet another mask filter layer according to an embodiment of the present invention.

It should be further noted that an area of the filter unit 22 may be greater than an area of the filter unit 21, and the mask filter layer may be shown in any one of FIG. 8 to FIG. 10, so as to improve quality of the dark pupil image. Certainly, in actual application, the filter unit 21 and the filter unit 22 in the mask filter layer may also be distributed in another manner. This is not specifically limited in this embodiment of the present invention.

In addition, in another possible implementation, when the first light emitting diode 31 or the second light emitting diode 32 emits a ray of a frequency, the mask filter layer includes at least two filter units. A frequency of the first light emitting diode 31 is the same as an operating frequency of a filter unit 21 in the at least two filter units, and a frequency of the second light emitting diode 32 is the same as an operating frequency of another filter unit 22 in the at least two filter units.

Further, after obtaining the bright pupil image and the dark pupil image by using the camera, the terminal may determine pupil location information and reflection point location information of the user based on the bright pupil image and the dark pupil image, determine a line-of-sight direction of the user based on the pupil location information, the reflection point location information, and a preset eyeball geometry model, and determine a point of gaze of the user, so as to track a line of sight of the user.

Figure 11:
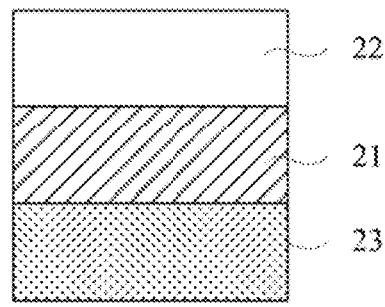
FIG. 11 is a schematic diagram of still yet another mask filter layer according to an embodiment of the present invention.

Referring to FIG. 11, the camera 2 includes a mask filter layer, and the mask filter layer includes at least three filter units, so as to collect rays of the at least one light emitting diode 3 that are reflected by the eye of the user, and obtain both a bright pupil image and a dark pupil image, thereby reducing a delay of tracking a line of sight of the user. The frequency band of the first light emitting diode 31 is the same as an operating frequency band of a filter unit 21 in the at least three filter units, the frequency band of the second light emitting diode 32 is the same as an operating frequency band of another filter unit 22 in the at least three filter units, and the frequency band of the third light emitting diode 33 is the same as an operating frequency band of still another filter unit 23 in the at least three filter units.

Figure 12:
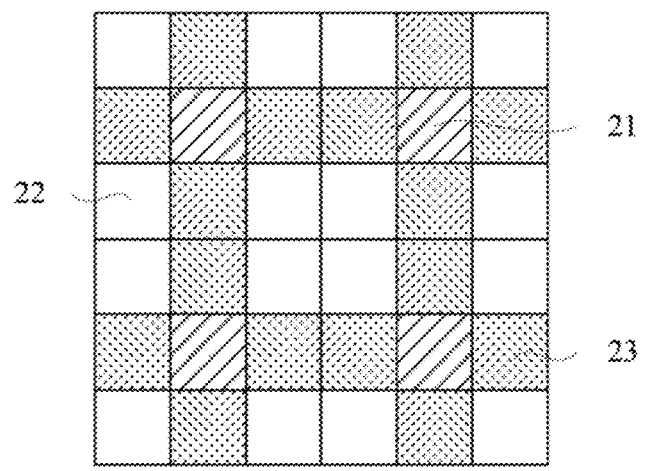
FIG. 12 is a schematic diagram of a further mask filter layer according to an embodiment of the present invention.

Referring to FIG. 12, in another possible implementation, the mask filter layer may include a plurality of filter units 21, a plurality of filter units 22, and a plurality of filter units 23.

It should be noted that the mask filter layer may not include the filter unit 23 when the frequency band of the third light emitting diode 33 is the same as the frequency band of the second light emitting diode 32.

Figure 13:
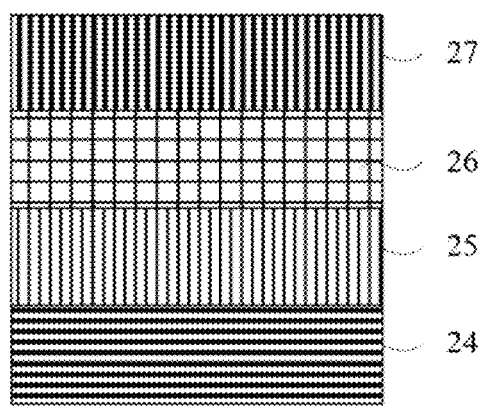
FIG. 13 is a schematic diagram of a still further mask filter layer according to an embodiment of the present invention.

Referring to FIG. 13, the camera 2 includes a mask filter layer, and the mask filter layer includes at least four filter units, so as to collect rays of the at least one light emitting diode 3 that are reflected by the eye of the user, and obtain both a bright pupil image and a dark pupil image, thereby reducing a delay of tracking a line of sight of the user. The frequency band of the fourth light emitting diode 34 is the same as an operating frequency band of a filter unit 24 in the at least four filter units, the frequency band of the fifth light emitting diode 35 is the same as an operating frequency band of a filter unit 25 in the at least four filter units, the frequency band of the sixth light emitting diode 36 is the same as an operating frequency band of a filter unit 26 in the at least four filter units, and the frequency band of the seventh light emitting diode 37 is the same as an operating frequency band of a filter unit 27 in the at least four filter units.

Referring to FIG. 14, the mask filter layer may include a plurality of filter units 24, a plurality of filter units 25, a plurality of filter units 26, and a plurality of filter units 27.

It should be noted that the frequency band of the fifth light emitting diode 35, the frequency band of the sixth light emitting diode 36, and the frequency band of the seventh light emitting diode 37 may be all the same or different. For example, in another possible implementation, the frequency band of the fifth light emitting diode 35 and the frequency band of the sixth light emitting diode 36 are both the same as the frequency band of the seventh light emitting diode 37. Correspondingly, the camera 2 includes a mask filter layer, and the mask filter layer includes two filter units. The frequency band of the fourth light emitting diode 34 is the same as an operating frequency band of one filter unit in the two filter units, and the frequency band of the fifth light emitting diode 35 is the same as an operating frequency band of the other filter unit in the two filter units. In another possible implementation, the frequency band of the sixth light emitting diode 36 is different from the frequency band of the fifth light emitting diode 35, and the frequency band of the fifth light emitting diode 35 is the same as the frequency band of the seventh light emitting diode 37. Correspondingly, the camera 2 includes a mask filter layer, and the mask filter layer includes three filter units. The frequency band of the fourth light emitting diode 34 is the same as an operating frequency band of a filter unit in the three filter units, the frequency band of the fifth light emitting diode 35 is the same as an operating frequency band of another filter unit in the three filter units, and the frequency band of the sixth light emitting diode 36 is the same as an operating frequency band of still another filter unit in the three filter units. This is not specifically limited in this embodiment of the present invention.

It should be further noted that the first light emitting diode 31, the second light emitting diode 32, the third light emitting diode 33, the fourth light emitting diode 34, the fifth light emitting diode 35, the sixth light emitting diode 36, and the seventh light emitting diode 37 are merely examples used to describe the at least two light emitting diodes, and a quantity of the at least two light emitting diodes is not specifically limited in this embodiment of the present invention.

It should be further noted that frequency bands of the filter units included in the mask filter layer are in a one-to-one correspondence with the frequency bands of the at least two light emitting diodes.

In this embodiment of the present invention, first, the terminal includes the body, and the camera and the at least two light emitting diodes mounted on the body. Because all of the at least two light emitting diodes can emit rays, it is ensured that the camera can collect reflected rays when the user is at different angles, thereby increasing a success rate of obtaining an eye image of the user, and increasing a success rate of tracking the line of sight of the user. Second, because the at least two light emitting diodes include the first light emitting diode and the second light emitting diode, and the distance between the first light emitting diode and the camera is shorter than the distance between the second light emitting diode and the camera, the reflected ray of the first light emitting diode is close to the axis of the optical center of the camera, the reflected ray of the second light emitting diode is far away from the axis of the optical center of the camera. In addition, the frequency band of the first light emitting diode is different from the frequency band of the second light emitting diode. The mask filter layer included in the camera includes the at least two filter units, an operating frequency band of a filter unit is the same as the frequency band of the first light emitting diode, and an operating frequency band of another filter unit is the same as the frequency band of the second light emitting diode. Therefore, the terminal can obtain both a bright pupil image and a dark pupil image by using the camera, so that a time for obtaining the image is reduced, a delay of tracking a line of sight of the user is reduced, and line-of-sight tracking accuracy is improved. Finally, all of the at least two light emitting diodes are infrared emitting diodes, and the camera is an infrared camera, so as to prevent the rays emitted by the at least two light emitting diodes from causing interference or damage to vision of the user, and improve security.

FIG. 15 shows a method for determining a point of gaze of a user of a terminal according to an embodiment of the present invention. Referring to FIG. 15, the method may be applied to any one of the foregoing terminals with a line-of-sight tracking function, and the method includes the following steps.

Step 1501: The terminal emits a first ray by using a first light source, and emits a second ray by using a second light source, where a frequency band of the first ray is different from a frequency band of the second ray, a distance between the first light source and a camera is shorter than a distance between the second light source and the camera, the camera includes a mask filter layer, and the first light source, the second light source, and the camera are all located on the terminal.

The terminal may perform, at intervals of preset duration, the operation of emitting the first ray by using the first light source and emitting the second ray by using the second light source in step 1501.

It should be noted that the preset duration may be set before the terminal emits the first ray by using the first light source and emits the second ray by using the second light source, and when the preset duration is shorter, real-time performance and accuracy of tracking a line of sight of the user are higher.

Further, a moment at which the terminal emits the first ray by using the first light source is the same as a moment at which the terminal emits the second ray by using the second light source, to reduce a time for tracking a line of sight of the user, thereby improving real-time performance of tracking the line of sight of the user.

Further, because there may be a plurality of second light sources, when there are a plurality of second light sources, the terminal may determine at least one second light source from the plurality of second light sources before emitting the second ray by using the second light source.

The terminal may determine the at least one second light source from the plurality of second light sources in the following two possible implementations: In a first possible implementation, the terminal selects a second light source in at least one location based on locations of the plurality of second light sources on the terminal, and determines the selected second light source as the at least one second light source, to ensure that the terminal can also obtain a dark pupil image when the user is at different angles, thereby increasing a success rate of line-of-sight tracking. In a second possible implementation, the terminal selects a second light source of at least one frequency band, and determines the selected second light source as the at least one second light source. Certainly, in actual application, the terminal may further select the at least one second light source from the plurality of second light sources in another possible implementation. This is not specifically limited in this embodiment of the present invention.

It should be further noted that the terminal may select, randomly or through polling each time, a second light source disposed in at least one location or a second light source of at least one frequency band. Certainly, in actual application, the terminal may further select a second light source disposed in at least one location or a second light source of at least one frequency band in another manner. This is not specifically limited in this embodiment of the present invention.

For example, second light sources are disposed in an upper right corner, a lower right corner, and a lower left corner of the terminal. Before currently emitting the second ray by using the second light source, the terminal determines the second light source disposed in the upper right corner as the at least one second light source. Before emitting a second ray by using a second light source for the first time after this time, the terminal may determine the second light source disposed in the lower right corner as the at least one second light source. Before emitting a second ray by using a second light source for the second time after this time, the terminal determines the second light source disposed in the lower left corner as the at least one second light source.

Step 1502: The terminal obtains a first image based on a first filter ray by using the camera, where the first filter ray is a ray obtained after a reflected first ray passes through the mask filter layer.

It should be noted that because the first ray is a ray emitted by the first light source, and the distance between the first light source and the camera is shorter than the distance between the second light source and the camera, the first image obtained by the terminal based on the first filter ray by using the camera is a bright pupil image of an eye of the user.

The operation of obtaining the first image by the terminal based on the first filter ray by using the camera may be as follows: The terminal performs exposure by using the camera, obtains image data in a current shooting range of the camera, obtains, from a sensor of the camera, image data corresponding to the first filter ray based on an arrangement manner of filter units that are at the mask filter layer included in the camera and whose frequency bands are the same as a frequency band of the first ray, and generates the bright pupil image based on the image data corresponding to the first filter ray.

It should be noted that a moment at which the terminal performs exposure by using the camera is the same as a moment at which the terminal emits the first ray by using the first light source, to ensure that the terminal can accurately obtain the first image based on the first filter ray by using the camera. Certainly, in actual application, the moment at which the terminal performs exposure by using the camera may also differ by specific duration from the moment at which the terminal emits the first ray by using the first light source. This is not specifically limited in this embodiment of the present invention.

It should be further noted that the specific duration may be determined by the terminal before the terminal performs exposure by using the camera.

Step 1503: The terminal obtains a second image based on a second filter ray by using the camera, where the second filter ray is a ray obtained after a reflected second ray passes through the mask filter layer.

Because the second ray is a ray emitted by the second light source, and the distance between the first light source and the camera is shorter than the distance between the second light source and the camera, the second image obtained by the terminal based on the second filter ray by using the camera is a dark pupil image of the eye of the user.

It should be noted that the operation of obtaining the second image by the terminal based on the second filter ray by using the camera is similar to the operation of obtaining the first image by the terminal based on the first filter ray by using the camera. Details are not described again in this embodiment of the present invention.

It should be further noted that a moment at which the terminal performs exposure by using the camera may also be the same as a moment at which the terminal emits the second ray by using the second light source, or a moment at which the terminal performs exposure by using the camera differs by the specific duration from a moment at which the terminal emits the second ray by using the second light source.

Further, the terminal may obtain at least one dark pupil image in step 1503 because the terminal may simultaneously emit a ray by using at least one second light source to simultaneously emit a second ray of at least one frequency band.

In addition, it can be learned from the foregoing description that the moment at which the terminal emits the first ray by using the first light source is the same as the moment at which the terminal emits the second ray by using the second light source. Therefore, when the terminal simultaneously emits the first ray by using the first light source and emits the second ray by using the second light source, the terminal may also simultaneously perform operations in steps 1502 and 1503, to simultaneously obtain the first image and the second image, thereby improving real-time performance of tracking a line of sight of the user.

Step 1504: The terminal determines a point of gaze of a user based on the first image and the second image.

Because the point of gaze is information about a location at which the eye of the user currently gazes, when locations at which the eye of the user currently gazes are different, locations of images formed by a same light source's ray entering the camera after being reflected by an eyeball are also different. The first image is the bright pupil image, the second image is the dark pupil image, and both the bright pupil image and the dark pupil image are images related to a ray reflected by the eye of the user. Therefore, the terminal may determine the point of gaze of the user based on the first image and the second image.

It should be noted that the point of gaze may be a specific coordinate value. Certainly, in actual application, the point of gaze may also be other information that can indicate a location at which the user currently gazes. This is not specifically limited in this embodiment of the present invention.

The operation of determining the point of gaze of the user by the terminal based on the first image and the second image may be as follows: The terminal determines pupil location information and reflection point location information of the user based on the first image and the second image, and determines the point of gaze of the user based on the pupil location information, the reflection point location information, and a preset eyeball geometry model.

It should be noted that because a pupil part of the eye of the user in the bright pupil image is bright, and the pupil part of the eye of the user in each dark pupil image is gray, pixel values that are in the bright pupil image and the dark pupil image and corresponding to the pupil part are greatly different from each other, but pixel values corresponding to another part are basically the same. Therefore, the terminal may perform differential processing on the pixel values in the bright pupil image and the dark pupil image to obtain a differential image, where a bright location in the differential image is a pupil location. Therefore, the terminal may determine a differential image for the first image and the second image, determine the pupil location information based on the differential image, perform image processing on the second image, and determine the reflection point location information of the second ray reflected by the eye of the user in the second image.

It should be further noted that for a method for performing differential processing on the first image and the second image, refer to a related technology. Details are not described in this embodiment of the present invention.

The terminal may set the eyeball geometry model according to a cornea reflection principle and a cornea refraction principle before determining the point of gaze of the user based on the pupil location information, the reflection point location information, and the preset eyeball geometry model.

It should be noted that the terminal may obtain a line-of-sight direction of the user based on the pupil location information, the reflection point location information, and the preset eyeball geometry model through estimation, and determine the point of gaze of the user based on the line-of-sight direction.

It should be noted that for a method in which the terminal sets the eyeball geometry model according to the cornea reflection principle and the cornea refraction principle and a method in which the terminal obtains the line-of-sight direction of the user based on the pupil location information, the reflection point location information, and the preset eyeball geometry model through estimation, and determines the point of gaze of the user based on the line-of-sight direction, refer to related technologies. Details are not described herein in this embodiment of the present invention.

Further, when the terminal obtains at least one second image, the terminal may randomly select one second image from the at least one second image, and determine one piece of pupil location information and one piece of reflection point location information based on the first image and the selected second image, to determine the point of gaze of the user. Certainly, to improve accuracy of tracking a line of sight of the user, the terminal may also determine one piece of pupil location information and at least one piece of reflection point location information based on the first image and the at least one second image, to determine the point of gaze of the user based on the pupil location information and the at least one piece of reflection point location information.

In this embodiment of the present invention, the terminal can emit the first ray by using the first light source on the terminal, and emit the second ray by using the second light source on the terminal. Because the distance between the first light source and the camera on the terminal is shorter than the distance between the second light source and the camera, the terminal can obtain, by using the camera, the first image based on the first filter ray obtained after the reflected first ray passes through the mask filter layer of the camera, and obtain, by using the camera, the second image based on the second filter ray obtained after the reflected second ray passes through the mask filter layer, where the first image is a bright pupil image, and the second image is a dark pupil image, so as to determine the point of gaze of the user based on the bright pupil image and the dark pupil image, thereby improving accuracy of tracking a line of sight of the user. In addition, because the frequency band of the first ray is different from the frequency band of the second ray, and the camera includes the mask filter layer, the terminal can simultaneously emit the first ray by using the first light source, and emit the second ray by using the second light source, to simultaneously obtain the first image and the second image, thereby reducing a time for obtaining the image, and improving real-time performance of tracking the line of sight of the user.

Figure 16:
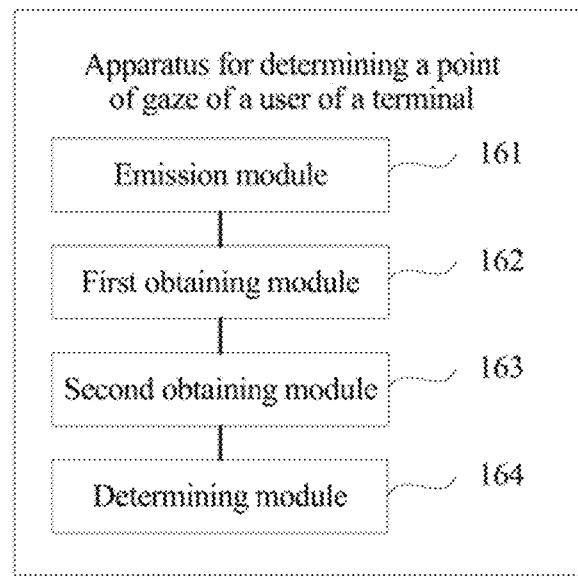
FIG. 16 is a schematic structural diagram of an apparatus for determining a point of gaze of a user of a terminal according to an embodiment of the present invention.

FIG. 16 is a schematic structural diagram of an apparatus for determining a point of gaze of a user of a terminal according to an embodiment of the present invention. The apparatus for determining a point of gaze of a user of a terminal may be implemented as a part or all of a terminal by using software, hardware, or a combination thereof, and the terminal may be a terminal shown in any one of FIG. 3 to FIG. 6. The apparatus for determining a point of gaze of a user of a terminal may include an emission module 161, a first obtaining module 162, a second obtaining module 163, and a determining module 164. The emission module 161 is configured to perform step 1501 in the embodiment in FIG. 15, the first obtaining module 162 is configured to perform step 1502 in the embodiment in FIG. 15, the second obtaining module 163 is configured to perform step 1503 in the embodiment in FIG. 15, and the determining module 164 is configured to perform step 1504 in the embodiment in FIG. 15.

Figure 17:
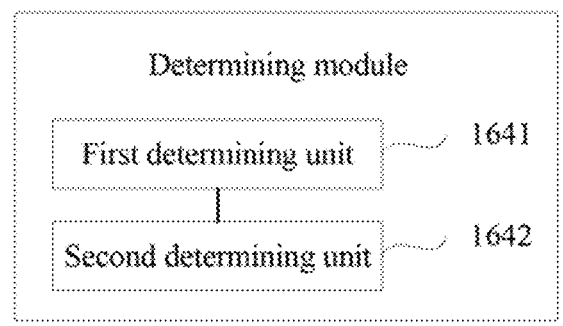
FIG. 17 is a schematic structural diagram of a determining module according to an embodiment of the present invention.

Optionally, referring to FIG. 17, the determining module 164 includes:

a first determining unit 1641, configured to determine pupil location information and reflection point location information of the user based on the first image and the second image; and a second determining unit 1642, configured to determine the point of gaze of the user based on the pupil location information, the reflection point location information, and a preset eyeball geometry model.

Optionally, a moment at which the emission module 161 emits the first ray is the same as a moment at which the emission module 161 emits the second ray.

In this embodiment of the present invention, the terminal can emit the first ray by using the first light source on the terminal, and emit the second ray by using the second light source on the terminal. Because the distance between the first light source and the camera on the terminal is shorter than the distance between the second light source and the camera, the terminal can obtain, by using the camera, the first image based on the first filter ray obtained after the reflected first ray passes through the mask filter layer of the camera, and obtain, by using the camera, the second image based on the second filter ray obtained after the reflected second ray passes through the mask filter layer, where the first image is a bright pupil image, and the second image is a dark pupil image, so as to determine the point of gaze of the user based on the bright pupil image and the dark pupil image, thereby improving accuracy of tracking a line of sight of the user.

It should be noted that when the line-of-sight tracking apparatus provided in the foregoing embodiment tracks a line of sight, division of the foregoing function modules is merely used as an example for description. In actual application, the foregoing functions may be allocated to different function modules for implementation as required. In other words, an internal structure of the terminal apparatus is divided into different function modules to implement all or some of the functions described above. In addition, the line-of-sight tracking apparatus provided in the foregoing embodiment pertains to a same concept as the embodiment of the line-of-sight tracking method. For a specific implementation process of the line-of-sight tracking apparatus, refer to the method embodiment. Details are not described herein again.

Figure 18:
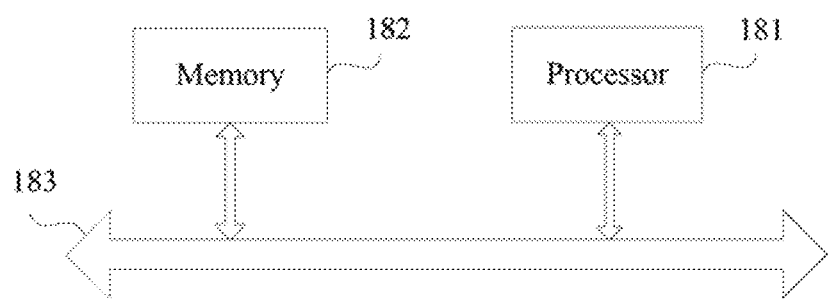
FIG. 18 is a schematic structural diagram of another apparatus for determining a point of gaze of a user of a terminal according to an embodiment of the present invention.

FIG. 18 is a schematic structural diagram of an apparatus for determining a point of gaze of a user of a terminal according to an embodiment of the present invention. The terminal mainly includes a processor 181 with one or more processing cores, a memory 182 that includes one or more computer readable storage media, a communications bus 183, and the like. A person skilled in the art may understand that a structure of the terminal shown in FIG. 18 does not constitute a limitation on the terminal. The structure may include more or fewer components than those shown in the figure, or combine some components, or have different component arrangements. This is not limited in this embodiment of the present invention.

The processor 181 is a control center of the terminal, and the processor 181 may be a general-purpose central processing unit (CPU), a microprocessor, an application-specific integrated circuit (application-specific integrated circuit, ASIC), or one or more integrated circuits configured to control program execution of the solution in this application. The processor 181 may run or execute a software program and/or a module stored in the memory 182 and invoke data stored in the memory 182, to implement the method for determining a point of gaze of a user of a terminal provided in the embodiment in FIG. 15.

The memory 182 may be a read-only memory (read-only Memory, ROM) or another type of static storage device that can store static information and instructions, or a random access memory (random access memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray disc, and the like), a disk storage medium or another magnetic storage device, or any other medium that can be used to carry or store expected program code in a form of an instruction or a data structure and that can be accessed by an integrated circuit. However, the memory 182 is not limited herein. The memory 182 may exist independently, and is connected to the processor 181 by using the communications bus 183. Alternatively, the memory 182 may be integrated with the processor 181.

In addition, the communications bus 183 may include a channel that transmits information between the processor 181 and the memory 182.

In this embodiment of the present invention, the terminal can emit the first ray by using the first light source on the terminal, and emit the second ray by using the second light source on the terminal. Because the distance between the first light source and the camera on the terminal is shorter than the distance between the second light source and the camera, the terminal can obtain, by using the camera, the first image based on the first filter ray obtained after the reflected first ray passes through the mask filter layer of the camera, and obtain, by using the camera, the second image based on the second filter ray obtained after the reflected second ray passes through the mask filter layer, where the first image is a bright pupil image, and the second image is a dark pupil image, so as to determine the point of gaze of the user based on the bright pupil image and the dark pupil image, thereby improving accuracy of tracking a line of sight of the user.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (Digital Versatile Disc, DVD)), a semi-conductor medium (for example, a solid state disk (Solid State Disk, SSD), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this application, but are not intended to limit this application. Any modification, equivalent replacement, or improvement made without departing from the spirit and principle of this application should fall within the protection scope of this application.

What is claimed is:
1. A terminal with a line-of-sight tracking function, wherein the terminal comprises:
   a body;
   a camera mounted on the body and comprising a mask filter layer, wherein the mask filter layer comprises at least two filter units; and at least two light emitting diodes (LEDs) mounted on the body and comprising a first LED, a second LED, and a third LED, wherein each of the LEDs is configured to emit a respective ray, and wherein the camera is configured to collect a ray corresponding to a reflected emitted ray, wherein the first LED comprises a first frequency band that is the same as an operating frequency band of a filter unit of the filter units, wherein the second LED comprises a second frequency band that is the same as an operating frequency band of another filter unit of the filter units, wherein the filter units comprise still another filter unit, wherein the third LED comprises a third frequency band that is the same as an operating frequency band of the still other filter unit, and wherein the first frequency band is different than the second frequency band.

2. The terminal of claim 1, wherein a distance between the first LED and the camera is shorter than a distance between the second LED and the camera.

3. The terminal of claim 2, wherein the LEDs further comprise a third LED, wherein the third LED comprises a third frequency band that is different than both the first frequency band and the second frequency band, and wherein the distance between the first LED and the camera is shorter than a distance between the third LED and the camera.

4. The terminal of claim 1, wherein the LEDs comprise a fourth LED, a fifth LED, a sixth LED, and a seventh LED, wherein a distance between the fourth LED and the camera is the shortest in distances between all the LEDs and the camera, and wherein a frequency band of the fourth LED is different than a frequency band of the fifth LED, a frequency band of the sixth LED, and a frequency band of the seventh LED.

5. The terminal of claim 4, wherein the camera is in an upper left corner of the body, wherein the fourth LED is in the upper left corner of the body, wherein the fifth LED is in an upper right corner of the body, wherein the sixth LED is in a lower left corner of the body, and wherein the seventh LED is in a lower right corner of the body.

6. The terminal of claim 4, wherein the frequency band of the fifth LED and the frequency band of the sixth LED are both the same as the frequency band of the seventh LED, wherein the frequency band of the fourth LED is the same as an operating frequency band of one filter unit in the filter units, and wherein the frequency band of the fifth LED is the same as an operating frequency band of a second filter unit in the filter units.

7. The terminal according to claim 4, wherein the frequency band of the sixth LED is different than the frequency band of the fifth LED, wherein the frequency band of the fifth LED is the same as the frequency band of the seventh LED, the mask filter layer comprises, wherein the frequency band of the fourth LED is the same as an operating frequency band of the first filter unit, wherein the frequency band of the fifth LED is the same as an operating frequency band of the second filter unit, and wherein the frequency band of the sixth LED is the same as an operating frequency band of a third filter unit.

8. The terminal of claim 1, wherein the LEDs are infrared emitting diodes, and wherein the camera is an infrared camera.

9. A method for determining a point of gaze of a user of a terminal, wherein the method comprises:
emitting a first ray by a first light source;
emitting a second ray by a second light source;
emitting a third ray by a third light source, wherein a frequency band of the first ray is different than a frequency band of the second ray, wherein the terminal comprises a camera comprising a mask filter layer, wherein the mask filter layer comprises filter units, wherein a first frequency band of the first light source is the same as an operating frequency band of a filter unit of filter units, and wherein a third frequency band of the second light source is the same as an operating frequency band of another filter unit in the filter units, wherein the filter units comprise still another filter unit, wherein the third frequency band is the same as an operating frequency band of the still other filter unit, and wherein the first light source, the second light source, and the camera are all located on the terminal;
obtaining, with the camera, a first image based on a first filter ray, wherein the first filter ray is obtained after a reflected first ray passes through the mask filter layer;
obtaining, with the camera, a second image based on a second filter ray, wherein the second filter ray is obtained after a reflected second ray passes through the mask filter layer; and
determining the point of gaze of the user based on the first image and the second image.

10. The method of claim 9, wherein determining the point of gaze of the user based on the first image and the second image comprises:
determining pupil location information and reflection point location information of the user based on the first image and the second image; and
determining the point of gaze of the user based on the pupil location information, the reflection point location information, and a preset eyeball geometry model.

11. The method of claim 9, wherein a moment of emitting the first ray by the first light source is the same as a moment of emitting the second ray by the second light source.

12. An apparatus for determining a point of gaze of a user of a terminal, wherein the apparatus comprises:
at least two light emitting diodes (LEDs), wherein the LEDs are configured to:
emit a first ray by a first LED;
emit a second ray by a second LED;
emit a third ray by a third LED;
at least one camera coupled to the LEDs, wherein the one camera comprises a mask filter layer comprising at least two filter units, and wherein the camera is configured to:
obtain a first filter ray based on a reflected first ray passing through the mask filter layer;
obtain a first image based on the first filter ray;
obtain a second filter ray based on a reflected second ray passing through the mask filter layer;
obtain a second image based on the second filter ray; and
a processor coupled to the camera and configured to determine the point of gaze of the user based on the first image and the second image, wherein the first LED comprises a first frequency band that is the same as an operating frequency band of a filter unit of the filter units, and wherein the second LED comprises a second frequency band that is the same as an operating frequency band of another filter unit in the filter units, wherein the third LED comprises a third frequency band that is the same as an operating frequency band of another filter unit of the filter units, wherein a frequency band of the first ray is different than a frequency band of the second ray, wherein a distance between the first LED and the camera is shorter than a distance between the second LED and the camera, and wherein the first LED, the second LED, and the camera are all located on the terminal.

13. The apparatus of claim 12, wherein the processor is further configured to:
  determine pupil location information and reflection point location information of the user based on the first image and the second image; and
  determine the point of gaze of the user based on the pupil location information, the reflection point location information, and a preset eyeball geometry model.

14. The apparatus of claim 12, wherein a moment at which the LEDs emit the first ray by the first LED is the same as a moment at which the LEDs emit the second ray by the second LED.

15. The terminal of claim 1, wherein each respective ray is emitted at the same moment.

16. The method of claim 9, wherein the first light source, the second light source, and the third light source are infrared emitting diodes, and wherein the camera is an infrared camera.

17. The method of claim 9, wherein the third frequency band is different than both the first frequency band and the second frequency band, and wherein a distance between the first light source and the camera is shorter than a distance between the third light source and the camera.

18. The apparatus of claim 12, wherein the first LED and the second LED are infrared emitting diodes, and wherein the camera is an infrared camera.

19. The apparatus of claim 12, wherein the third frequency band is different than both the first frequency band and the second frequency band, and wherein a distance between the first LED and the camera is shorter than a distance between the third LED and the camera.

20. The apparatus of claim 12, wherein each of the first ray, the second ray, and the third ray is emitted at the same moment.

* * * * *